United States Patent
Whitman et al.

(10) Patent No.: US 10,771,614 B1
(45) Date of Patent: Sep. 8, 2020

(54) EVENT RESPONSE MANAGEMENT

(71) Applicant: International Business Machines Corporation, Armonk, NY (US)

(72) Inventors: Todd Russell Whitman, Bethany, CT (US); Michael Bender, Rye Brook, NY (US); Jeremy R. Fox, Georgetown, TX (US); Kulvir Singh Bhogal, Fort Worth, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/438,782

(22) Filed: Jun. 12, 2019

(51) Int. Cl.
*H04M 3/00* (2006.01)
*H04M 1/725* (2006.01)

(52) U.S. Cl.
CPC ... *H04M 1/72566* (2013.01); *H04M 1/72569* (2013.01); *H04M 1/72572* (2013.01)

(58) Field of Classification Search
CPC ............................ H04L 67/26; H04M 3/42365
USPC ........................................................ 455/466
See application file for complete search history.

(56) References Cited

U.S. PATENT DOCUMENTS

| | | | | |
|---|---|---|---|---|
| 6,047,260 | A * | 4/2000 | Levinson | G06Q 10/063114 705/7.15 |
| 6,381,580 | B1 * | 4/2002 | Levinson | G06Q 10/06311 705/7.13 |
| 7,027,996 | B2 * | 4/2006 | Levinson | G06Q 10/06311 705/7.26 |
| 8,065,073 | B2 | 11/2011 | Downs | |
| 9,232,040 | B2 | 1/2016 | Barash | |
| 9,342,976 | B2 | 5/2016 | Pfeffer | |
| 9,554,356 | B2 * | 1/2017 | Dotan-Cohen | ... H04M 3/42365 |
| 10,108,912 | B1 | 10/2018 | Conroy | |
| 10,135,937 | B2 * | 11/2018 | Dotan-Cohen | ...... G06Q 10/109 |
| 10,142,487 | B2 * | 11/2018 | Dotan-Cohen | ... H04M 3/42365 |
| 10,614,794 | B2 * | 4/2020 | Qian | ......................... G10L 15/22 |
| 2008/0114841 | A1 * | 5/2008 | Lambert | .............. G06Q 10/107 709/206 |
| 2008/0207232 | A1 * | 8/2008 | Rice | ....................... G06F 16/972 455/466 |
| 2010/0158202 | A1 | 6/2010 | Johnson | |
| 2011/0071880 | A1 | 3/2011 | Spector | |
| 2011/0099040 | A1 | 4/2011 | Felt | |

(Continued)

OTHER PUBLICATIONS

"Global Intelligent Virtual Assistant Market 2018-2023," PRNewswire, Jul. 23, 2018, 4 pages. <https://www.prnewswire.com/news-releases/global-intelligent-virtual-assistant-market-2018-2023-300684769.html>.

(Continued)

*Primary Examiner* — William D Cumming
(74) *Attorney, Agent, or Firm* — Brian D. Welle (57) ABSTRACT

An upcoming event associated with a predicted time in the future is detected. A set of users of a database that have responded to events of the database that correspond with the upcoming event may be identified. Data on a current state of each user of the set of users may be gathered, after which a user of the set of users to respond to the upcoming event may be identified by analyzing the data and the database. It may be determined, using the database and the data, that it is approaching a deadline time at which the user must act in order to respond to the upcoming event by the predicted time. A reminder for the user may be generated in response to determining that it is approaching the deadline time.

15 Claims, 3 Drawing Sheets

(56) References Cited

U.S. PATENT DOCUMENTS

| | | | |
|---|---|---|---|
| 2014/0359007 A1 | 12/2014 | Grube | |
| 2016/0098687 A1* | 4/2016 | Lamons | G06Q 10/1095 |
| | | | 705/7.19 |
| 2016/0248865 A1* | 8/2016 | Dotan-Cohen | H04L 67/26 |
| 2016/0249319 A1* | 8/2016 | Dotan-Cohen | H04M 3/42365 |
| 2017/0118348 A1* | 4/2017 | Dotan-Cohen | H04M 3/42365 |

OTHER PUBLICATIONS

"IBeacon—Apple Developer," Apple, accessed Jun. 6, 2019, 1 page. <https://developerapple.com/ibeacon/>.

"Simple, battery-efficient APIs for location and context," Google Developers, accessed Jun. 6, 2019, 2 pages. <https://developers.google.com/location-context/>.

"The Virtual Digital Assistant Market Will Reach $15.8 Billion Worldwide by 2021," Tractica, Aug. 3, 2016, 4 pages. <https://www.tractica.com/newsroom/press-releases/the-virtual-digital-assistant-market-will-reach-15-8-billion-morldwide-by-2021/>.

Crum, "Amazon Alexa: Announcing Contact and Motion Sensor APIs and Integration into Alexa Routines, Unlocking New Customer Scenarios in Home Automation, Monitoring, and Control," Aug. 28, 2018, 2 pages. <https://developer.amazon.com/blogs/alexa/post/bda9d70c-2f0d-454d-9939-2eb82868cf35/announcing-contact-and-motion-sensor-apis-and-integration-into-alexa-routines-adding-new-home-automation-features-for-customers-and-new-opportunities-for-smart-home-develop>.

Grunin, "Alexa gets location-based routines and reminders," CNET, Dec. 10, 2018, 2 pages. <https://www.cnet.com/news/alexa-gets-location-based-routines-and-reminders/>.

Mukhopadhyay et al., "A Decision Theoretic Framework for Emergency Responder Dispatch," in Proceedings of the 17th International Conference on Autonomous Agents and MultiAgent Systems (AAMAS '18), Jul. 10-15, 2018, pp. 588-596.

Wiggers, "Why Android Nearby, iBeacons, and Eddystone failed to gain traction," VentureBeat, Oct. 27, 2018, 5 pages. <https://venturebeat.com/2018/10/27/why-android-nearby-ibeacons-and-eddystone-failed-to-gain-traction/>.

* cited by examiner

EVENT RESPONSE MANAGEMENT

BACKGROUND

People increasingly rely on their electronic devices to keep schedules and dates organized, and/or to remind them of events to respond to. For example, calendars may be shared across numerous devices and between numerous people, such that a single event on a shared calendar may result in prompts across numerous devices for numerous people. Further, people may rely on sensors more and more to alert them to various detectable events. For example, smart doorbells may send messages to users' phones that a person is at a front door and/or proximity sensors or entryway sensors may alert parents when a child has come home, or the like.

SUMMARY

Aspects of the present disclosure relate to a method, system, and computer program product relating to event response management. For example, the method may include detecting, by a processor, an upcoming event associated with a predicted time in the future. The method may further include identifying, by the processor consulting a database of user actions, a set of users of the database that have responded to events of the database that correspond with the upcoming event. The method may further include gathering, by the processor, data on a current state of each user of the set of users. The method may further include identifying, by the processor analyzing the data and the database, a user of the set of users to respond to the upcoming event. The method may further include determining, by the processor using the database and the data, that it is approaching a deadline time at which the user must act in order to respond to the upcoming event by the predicted time. The method may further include generating, by the processor in response to determining that it is approaching the deadline time, a reminder for the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. However, they do not limit the invention to the particular embodiments described. On the contrary, the disclosure covers all modifications, equivalents, and alternatives falling within the spirit and scope of the invention.

DETAILED DESCRIPTION

Aspects of the present disclosure relate to event response management, and more particular aspects relate to using data from a plurality of sensors and a database of historical responses to detect an upcoming event and then determine one of a plurality of users for which to generate a notification for this upcoming event. While the present disclosure is not limited to such applications, various aspects of the disclosure may be appreciated through a discussion of various examples using this context.

People are becoming increasingly dependent on their set of computing devices (e.g., mobile phones, laptops, automated assistants, online calendars, security systems, and the like) to inform them and remind them of things. Computing systems may be capable of informing users of events such as picking kids up from the bus stop in response to the bus getting close to the bus stop. However, in some circumstances there may be a plurality of users to inform (e.g., both parents and an older sibling), and it may be difficult and/or impossible for conventional computing systems to identify which of the users to notify. As such, conventional computing systems may identify all relevant users, such that users must discuss, between themselves and after the notification, which one will respond to the notification. Such a practice may be relatively less efficient, particularly for time-sensitive events.

Figure 1:
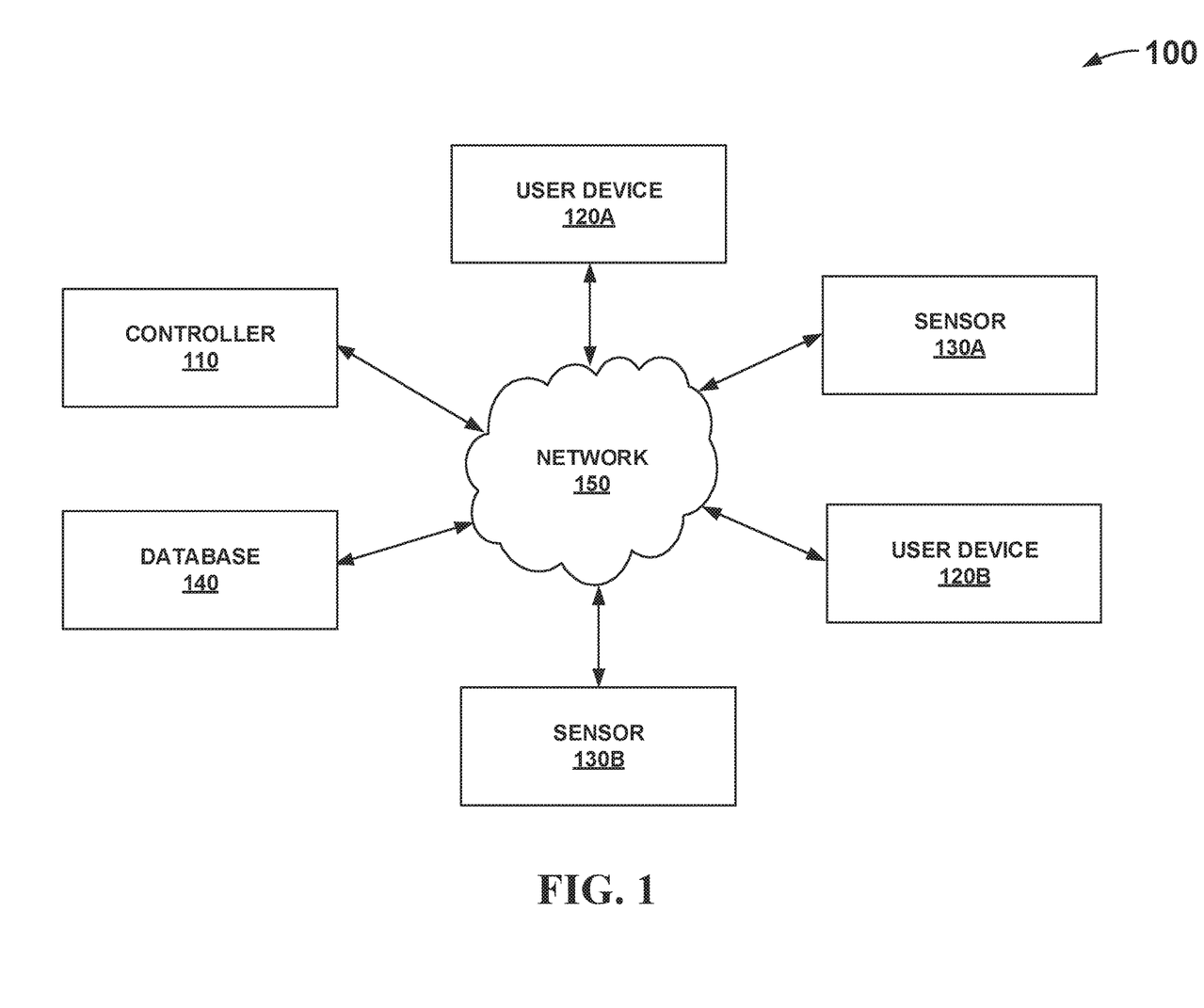
FIG. 1 depicts a conceptual diagram of an example system in which a controller manages event response using a plurality of sensors and a plurality of user devices using a database of historical response actions.

Aspects of this disclosure relate to improving and/or fixing this dilemma. For example, a computing system may include a controller that is configured to determine a user who usually responds to a detected event using machine learning. For example, the computing system may determine that a given user "usually" responds if that user responds at more than a threshold rate (e.g., at a 75% rate ore more), if that user has responded to 100% of detected events, if that user always responds unless the user is busy in the moment, or the like. The controller may further identify such information as the relative location and current activity of each of a group of users as being relevant as to which user of the group is most able and/or inclined to respond to an event. Once the controller has gathered this information, the controller may use it to identify the user that is more able and/or inclined to respond to the event, and generate a reminder for this identified user if the controller determines that this user is not responding. In certain examples, the controller may further provide secondary backup users if the controller identifies that the primary user is not responding within a predetermined and/or calculated time deadline for response. In this way, aspects of this disclosure may be configured to provide a technical solution that improves the ability of a scheduling computing system in determining who to generate initial notifications for and therein generate subsequent notifications prior to an event occurring such that the event gets responded to in a timely manner. As used herein, the term 'event' can include a notification of an upcoming or predicted event (e.g., predicted according to the techniques disclosed herein). Thus, responding to an event can include responding to a notification of an upcoming or predicted future event For example, FIG. 1 depicts system 100 that includes controller 110 that is configured to manage event responses. Controller 110 may include a computing device, such as computing device 200 of FIG. 2 that includes processor 220 communicatively coupled to memory 230 that includes instructions 240 that, when executed by processor 220, cause controller 110 to execute the operations described below. In some examples, controller 110 may begin operations by monitoring user actions and events and responses to build or otherwise add to a baseline of event responses. Controller 110 may store and/or access this baseline of event responses in database 140, which may be a computing device as described herein. For example, database 140 may include a server or a rack of servers or a laptop or a desktop or the like.

Controller 110 may monitor actions as sent between one or more user devices 120A, 120B (collectively referred to as "user devices 120") to generate database 140. User devices 120 may include computing devices (similar to computing device 200 of FIG. 2 as described below) such as mobile phones, laptops, desktop computers, smart wearable devices (e.g., smart watches or smart glasses), or the like. User devices 120 may include a processor communicatively coupled to a memory, as described herein.

For another example, controller 110 may monitor actions, responses, and events using sensors 130A, 130B (collectively, "sensors 130") to generate database 140. Sensors 130 may include computing devices (also similar to computing device 200 of FIG. 2 as described below) that are configured to detect one or more events. For example, sensors 130 may include cameras and/or proximity sensors or image sensors or the like of a computing system such as a security system or home automation system. Alternatively, sensors 130 may include global positioning system (GPS) sensors or the like of one or more devices such as in an automobile or of a phone. Sensors 130 may also include biometric sensors such as a heart rate sensor of a smart watch or the like. In some examples, sensors 130 may include devices of the Internet of Things (IoT), and may include some or all devices of the IoT that are associated with the users that may respond to the events. Other type of sensors that are consistent with this disclosure are also possible. Though only two sensors 130 are depicted for the sake of illustration, it is to be understood that dozens or hundreds or more sensors 130 may be used by controller 110 to gather data on events.

Controller 110 may gather data of user devices 120 and/or sensors 130 over network 150. Network 150 may include a computing network over which computing messages may be sent and/or received. For example, network 150 may include the Internet, a local area network (LAN), a wide area network (WAN), a wireless network, or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user devices 120, sensors 130, and/or database 140) may receive messages and/or instructions from and/or through network 150 and forward the messages and/or instructions for storage or execution or the like to a respective memory or processor of the respective computing/processing device.

Though network 150 is depicted as a single entity in FIG. 1 for purposes of illustration, in other examples network 150 may include a plurality of private or public networks. For example, user device 120A and sensors 130A may communicate together over a private WLAN of network 150, such as a home WLAN network over which automation updates or biometric updates or the like are sent between sensor 130A and user device 120A. User device 120B and sensor 130B may communicate in much the same way over a second private WLAN of network 150. Further, controller 110 may use the data to generate and/or add to database 140 over a third private LAN of network 150. Additionally, controller 110 may communicate with user devices 120 and/or sensors 130 over a public portion of network 150 using the Internet.

Controller 110 may gather and/or receive a plurality of data in order to generate and/or add to database 140. Controller 110 may receive an opt-in from one or all of user devices 120 prior to gathering and/or receiving this data. For example, one or many or each of user devices 120 may affirmatively go to a software application associated with controller 110 in order to authorize controller 110 to gather and/or receive data described herein.

In some examples, controller 110 may provide computing agents that are housed on user device 120 and/or sensors 130 to forward alerts and messages or the like to controller 110. These computing agents may only forward along alerts and messages that meet the criteria of data in database 140, which is to say data that raises or lowers a possibility or inclination of a user responding to an event. Alternatively, or additionally, controller 110 may itself gather or collect data that is sent between user devices 120 and/or sensors 130 as this data is transmitted over network 150 (e.g., by evaluating messages that traverse a firewall of network 150).

Database 140 may include a plurality of events that require a response from a user. These events may be entered by users (e.g., as a result of the users knowing that they want to be reminded by controller 110 over these events), and/or these events may be identified by controller. For example, controller 110 may identify that an alert sent to both user device 120A and user device 120B is followed by messages sent between the user devices 120, which itself is followed by one of the user devices 120 acting to respond to the alert. Controller 110 may analyze this and identify the pattern (alert followed by communication followed by action from one user) as indicating an event and a response. Controller 110 may identify an occurrence as an event if it has happened many times or if it has only happened once. In some examples, controller 110 may identify a situation as an event as described herein as soon as it occurs (e.g., even if controller 110 has no record of another situation that is substantially similar to this situation within database 140).

Controller 110 may further gather data such as factors that indicate if a user is more or less likely to respond to an event in a timely manner. Controller 110 may identify data to be factors that impact such a likelihood whether these factors occurred many times or a single time. Controller 110 may analyze data gathered across network 150 and evaluate correlations between the data and subsequent events to identify these factors.

For example, if an event alert is sent to both user devices 120 and user device 120A responds when user device 120B has a calendar entry "meeting" during the event alert, controller 110 may identify meetings associated with user device 120B as indicating that the user of user device 120B may be relatively less likely to respond to events during meetings. For another example, if an event alert is sent to both user devices 120 and controller 110 identifies that user device 120A always responds when user device 120A is at a certain geographical location, controller 110 may identify that this and/or similar geographical positions indicates that the user of user device 120A is relatively more likely to respond. For another example, controller 110 may determine that user device 120A responds to an event after user device 120B sends a message with language such as "this is your turn," and may therein identify that this event alert (and/or similar event alerts) are handled in an alternating fashion by the users of user devices 120. In this way, over time controller 110 may identify (and/or update, when relationships change) causal patterns that may indicate factors that make a user relatively more or less likely to respond to an event.

Controller 110 may also determine which events do not require a response. For example, if some alerts generated by sensors 130 or the like for user devices 120 are regularly followed by non-action from users (e.g., as detected by a static non-changing GPS location of both user devices 120, by a user not leaving a house as detected by proximity or camera sensors 130, or the like), controller 110 may determine that those alerts are associated with events that do not require a response. Similarly, controller 110 may identify that some events and/or alerts are inconsistently followed by action by users (e.g., only responded to by users 40% of the time, which is below a 50% threshold), in response to which controller 110 identifies that the event does not require a response. Further, controller 110 may identify event profiles for events that did not occur previously as monitored by controller 110 but require a response. For example, controller 110 may identify that events that are associated with certain entities (e.g., family members, emergency responders, or the like), and/or events associated with certain taglines (e.g., emails or texts that include the words "urgent", "emergency, or the like) may be associated with a desired high rate of response, even if the users had never encountered the event before.

In this way, database 140 may be generated such that database 140 includes a list of rules and preferences indicating which events require responses, which users are in a pool that might respond to these events, and factors that may indicate which user of this pool is most likely and/or inclined to respond to a respective event. For example, database 140 may include four users and ten events, where the rules indicate different combinations of the four users as associated with responding to the events (e.g., in some instances only three users are associated with responding to an event, in other instances two, and in other instances only one). Controller 110 may also generate database 140 such that specific events have different time deadlines for response, potentially including different time deadlines for different users and/or different time deadlines depending upon a location of each user. For example, controller 110 may identify when certain events need to be responded to based on: when users have responded to them in the past, communication following responses (e.g., if after a response controller 110 detects communication over network 150 stating that a user was early or late), and/or environmental factors that may impact an ability of a user to get to a location of an event (e.g., weather, traffic, construction, or the like).

For example, if a child is to be picked up at 3:00 from school, different time deadlines can be set such that a user is able to respond in time to pick up the child at 3:00. Continuing with this example, different deadlines for response can be set for different users based on one or more factors, such as those discussed above. For example, if it is determined that a first user needs fifteen minutes to arrive from the first user's current location to the school in order to be at the school at 3:00, the deadline for response can be set at fifteen minutes before 3:00 and the notification sent earlier, such as at 2:30. Additionally, the deadlines for the different users can be dependent on each other in some embodiments. For example, if it takes a second user twenty minutes to arrive at the school from the second user's current location, then the deadline for the first user to respond can be set at twenty minutes before 3:00 to enable time to notify the second user in the event that the first user does not take action by the deadline.

In some examples, each event may have different factors that indicate a user that is most likely to respond. Some events may have different factors for different users, where, e.g., for a given event only a location of a first user is evaluated, whereas for the given event for a second user both location and current activity are evaluated, and for a third user both a current activity and a current temperament and/or stress level (e.g., as identified by sensors 130 and/or by communication gathered between user devices 120) are evaluated. Stress, as determined and/or evaluated herein, may include either how stressed a person is as indicated by their current actions and/or by certain biometric data. Further, as maintained by controller 110, database 140 may manage and/or evaluate events such that each event is associated with a "default" user, which may be a user that will respond if no other factors are particularly strong in distinguishing the potential responding factors.

Some or all users may have partial or full ability to modify data and/or rules of database 140. For example, users may use user devices 120 to access database 140 over network 150, therein making or modifying rules by which controller 110 identifies a responding user. Further, users may select or change events (or otherwise update event profiles) to which users are supposed to respond to. For example, controller 110 may have identified a first user as being associated with responding to an event as a result of a single instance of the first user responding to this event, but an administrative user may identify that this one-time response was an anomaly, and may therein remove an association between the first user and the event.

A user may also create or modify time deadlines for any of the users. For example, database 140 may include different time deadlines for different users, where one user is informed about an event five minutes before the user must respond, and another user is informed about an event fifteen minutes before that user must respond, or the like. One or some or all users may change their preferences for when and/or how they are reminded. For example, users may specify which of respective user devices 120 a reminder should go to and how that reminder is received (e.g., whether a text alert, an email, a phone call, an alarm through a home automation device, or the like).

Once controller 110 has generated database 140, controller 110 may monitor actions across network 150 and generate reminders for users according to rules of database 140 and preferences entered by users and the like. For example, controller 110 may detect an event as a result of an email sent to user device 120A indicating an incoming delivery within thirty minutes. Controller 110 may compare the incoming delivery event to database 140 and determine that this is an event that warrants a response, and that two of the three users (e.g., the heads of household that can sign for the delivery) are part of a set of users that may respond. In response to this, controller 110 may evaluate both users to determine which user should reply.

For example, controller 110 may evaluate if one user is relatively more free (e.g., as a result of checking both calendars and current activity to determine that both users are relatively free/available), evaluate if one user is relatively closer to or otherwise has more ability to get to a location that is determined to be the location of the event (e.g., evaluate if one of the two users is low on gas or if one user would have difficulty getting to the home as a result of environment data factors such as road construction or inclement weather or the like, and determining that both users are ten minutes away), evaluate if one user is relatively less stressed (e.g., evaluate biometric sensors and/or recent messages to determine that both users are relatively agitated or calm), and/or evaluate if there is a default user (e.g., determine that all factors are relatively equal, and therein identify a default user from database 140). Controller 110 may consult local conditions using online resources and the like to determine environmental factors and time deadlines. Once controller 110 has identified a responding user, controller 110 may notify the user according to that user's preferences as stored in database 140 (e.g., notifying the user when the user has to take off within five minutes). In certain examples, controller 110 may only notify a user if the user does not start moving before a time deadline. Put differently, controller 110 may wait to see if the user will start responding before controller 110 reminds the user to respond.

Controller 110 may be configured to identify if a user ignores a notification, and in response to this controller 110 may identify a second backup user. For example, controller 110 may always determine a ranked order of users for each response according to the factor-evaluation described above, and notify each user according to their rank in response to the previous user (e.g., the user that was determined to be relatively more available or inclined to respond) failing to respond prior to the deadline. Subsequent users may be alerted with a notification that indicates that previous users did not respond, therein alerting the subsequent users that a prompt response may be warranted. In some examples, the ranked list may be created such that each user is notified prior to their time deadline. For example, if a first user that is five minutes away from an event is determined to be more available for response than a second user that is ten minutes away, controller 110 may notify the second user fifteen minutes prior to the event to confirm a response from the second user. In this way, controller 110 may still notify the first user when ten minutes are left if the second user fails to respond (or affirmatively notifies controller 110 that he will not respond).

Once controller 110 detects that the user responded to the event, controller 110 may add the event and response cycle (e.g., the full cycle of event and availability factor analysis, and user notification and response from the user, including whether a user responded in time) to database 140. In some situations, controller 110 may alter one or more rules of database 140 in response to the event cycle. For example, where the notified user responded in a stressed manner to the notification from controller 110 (e.g., as indicated by increased heart beat as gathered by biometric sensors, or as identified by relatively harsh language used by the user as gathered by one or more auditory sensors, or the like), controller 110 may lower a stress threshold of that user, such that it is relatively easier for controller 110 to elect a different user as a result of that user being determined to be stressed. For another example, where the initial notified user did not respond to the event, an availability threshold for that user may be increased, such that the unresponsive user may have to be relatively more available before controller 110 determines to notify that user. In this way, controller 110 may use machine learning techniques to get better at managing event response over time.

For example, controller 110 may have monitored user "Brian" and "Lisa," and may have determined that their children come home from school on the bus between 3:30 and 3:45 depending on when the bus leaves the school and traffic. Controller 110 may have learned that when the bus comes at 3:30, Brian picks them up, but when it comes at 3:45 Lisa picks them up. Controller 110 may calculate that the bus will show up at 3:30 based on GPS sensor 130 data, and, upon detecting Brian getting out of his chair at 3:25 from home video sensor 130, data controller 110 may elect to not notify Brian (since Brian already appears to be on his way), and/or to notify Lisa that Brian is picking the kids up (e.g., notify via a text sent over network 150). On a subsequent day, controller 110 may determine that Brian's calendar indicates that Brian has a meeting at 3:30, such that Brian will be unavailable. In response to this determination, controller 110 may notify Lisa at 3:20 that she should pick up the children since controller 110 has learned that it takes her 10 minutes to get to the bus stop.

For another example, controller 110 may have monitored users "Patrick," "Sarah," and "Steven," which may all be family members at a home. Controller 110 may have identified that Patrick usually takes out the garbage on Tuesdays, but on one Tuesday, controller 110 may detect via emails in Patrick's email inbox that a project deadline has resulted in Patrick going to the office early (as detected via garage door sensors 130). Controller 110 may determine that the garbage truck is five minutes away and that the garbage is not out yet. Controller 110 may determine that Sarah has already left for work (e.g., via GPS sensors 130 of her mobile phone user device 120 and/or car), and that Steven has just woken up (e.g., as a result of Steven silencing his morning alarm on his user device 120) and is getting ready (e.g., as detected via use of various kitchen appliance sensors 130 connected to IoT). As such, controller 110 may notify Steve to take out the garbage. Further, controller 110 may update database 140 to account for project deadlines for future availability.

For another example, controller 110 may monitor a household with users "Peter" and "Julia" and their son "Jeff" Controller 110 may detect that a delivery is expected at the home, and that currently each of Peter and Julia and Jeff are at home. Controller 110 may further detect that someone needs to be outside to signal to the driver where to place the delivery (e.g., either by evaluating a delivery against previous deliveries, or by comparing the name of the delivery company with their online instructions, or the like). Controller 110 may consult database 110 and determine that usually Peter would perform this action (such that Peter is a default user), and if not, Julia or Jeff would. Controller 110 may detect that Peter is busy presenting in a work meeting in his home office (e.g., as detected via various sensors 130 indicating an ongoing phone call as well as a meeting in Peter's schedule), Julia is napping (e.g., as indicated by a nap sleep alarm on her mobile phone user device 120), and Jeff is eating a sandwich while listening to music with his headset on (e.g., via sensors 130 in the headset and/or a camera sensor 130) when the delivery driver is approaching. Controller 110 may determine the best respondents in a ranked order, first notifying Jeff to direct the driver. If controller 110 detects that Jeff is not moving or otherwise not responding to respond to the event, controller 110 may notify Julia. If Julia is not detected as responding and remains sleeping, controller 110 may alert Peter that all other available responders were unavailable to respond to the event.

Figure 2:
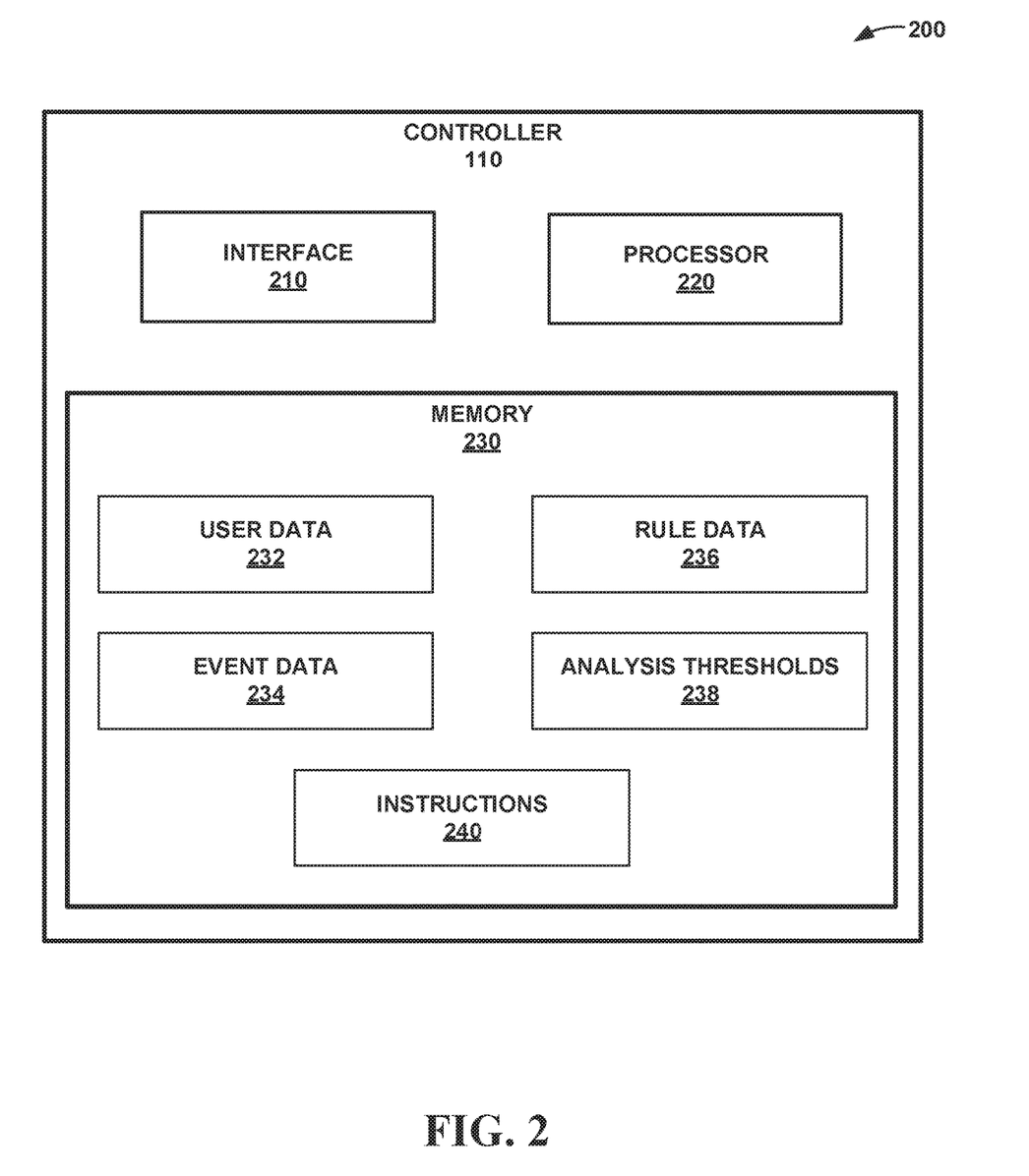
FIG. 2 depicts a conceptual block diagram of a computing system that may be configured to manage event response.

As described above, controller 110 may include computing device 200 with a processor configured to execute instructions stored on a memory to execute the techniques described herein. For example, FIG. 2 is a conceptual box diagram of such computing device 200 of controller 110. While controller 110 is depicted as a single entity (e.g., within a single housing) for the purposes of illustration, another example controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) and/or to communicate with entities external to controller 110. Specifically, interface 210 may be configured to enable components of controller 110 to communicate with user devices 120, sensors 130, database 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage event response as described above. Controller 110 may utilize processor 220 to manage the responses of users to events. Processor 220 may include, for example, microprocessors, digital signal processors (DSPs), application-specific integrated circuits (ASICs), field-programmable gate arrays (FPGAs), and/or equivalent discrete or integrated logic circuit. Two or more of processor 220 may be configured to work together to manage user response.

Processor 220 may manage user responses to events according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage event response according to instructions 240 of one or more applications (e.g., software applications) stored in memory 230 of controller 110.

In addition to instructions 240, in some examples gathered or predetermined data or techniques or the like as used by processor 220 to manage event responses may be stored within memory 230. For example, memory 230 may include information described above that may be stored in database 140, and/or may include substantially all of database 140. For example, memory 230 can include user data 232, which may include a list of each user that may respond to events or may otherwise be associated with the events.

User data 232 may include a general profile of each user, such as profiles that define one or more relationships to one or more events or one or more other users (e.g., parent, grandparent, sibling, teacher, elder, emergency contact, etc.). User data 232 may provide sufficient information to identify each user through data gathered over network 150, such as a voice profile and facial recognition pattern and the like for one or more users, such that controller 110 may use user data 232 to identify, locate, and/or analyze users. User data 232 may further include a set of preferences for each user, such as whether the users want to be reminded for each event or only reminded when the user has not responded by a deadline. User data 232 may also include preferences such as the amount of advanced warning that users want for when to respond to events. In some examples, user data 232 may indicate that a single user may want different amounts of advanced warning for different types of events (e.g., ten minutes for events that the user has to drive to, and five minutes for events that a user has to walk outside for), or a different number of length of advanced warning depending upon the time of day (e.g., on reminder at twenty minutes followed by another reminder at five minutes advanced warning for events during the work day, and a single reminder with one minute advanced warning for events after work hours), or the like. User data 232 may also associate one or more user devices 120 and/or sensors 130 with a user, such as by associating a cell phone user device 120 with a user, and also associating sensors 130 of a car with the user, or the like.

In certain cases, user data 232 may include a general reliability score of the users. For example, some users may be relatively more reliable at responding to events, absent exigent circumstances, which may include circumstances outside the control of the user (e.g., acts of God, traffic accidents, or other types of sudden emergencies or the like). In such examples, where controller 110 detects that two users are both relatively available and inclined to respond to an event, controller 110 may determine to generate a notification for the user that has been relatively more reliable, such that the user has been more consistent at responding to events on time. In some examples, controller 110 may be configured to detect such exigent circumstances, such as a declared tornado warning or a car breaking down or the like, to therein autonomously maintain and update a reliability score over time.

Memory 230 may also store event data 234, which may include information on what types of alerts or situations indicate an event. For example, event data 234 may include profiles of given events, such that controller 110 may match data from user devices 120 and/or sensors 130 to an event profile of event data 234 to detect and/or categorize an upcoming event. For example, event data 234 can include event profiles saying that an incoming delivery email is an event, or a GPS sensor indicating that a school bus is approaching is an event, or that certain dates and times indicate an event, or the like. Further, event data 234 may include data on a location of an event. For example, some events may happen in substantially the same location every time, and/or a location of an event may be determined by a substantially similar routine (e.g., by checking on online schedule at a predetermined website to see what field a soccer game is this week), such that controller 110 may check event data 234 to determine a location of an event.

In some examples, some event data 234 may further include security data. Specifically, events that may be associated with something that is relatively more sensitive or warrants more protections may be associated with a longer deadline (e.g., giving more time to get to the event). For example, event data 234 having to do with picking up an elementary school student from a bus stop may have a larger security concern than picking up a high school student from soccer practice, such that controller 110 includes a relatively larger time deadline for picking up the elementary school student to ensure that a user gets to the bus stop in time. For another example, event data 234 having to do with deliveries of standard household goods may have a relatively smaller security concern than deliveries of electronics.

Further, as discussed herein, controller 110 may reference rule data 236 as stored in memory 230 to determine what user to prompt for which event. For example, rule data 236 may include a list of factors to decide when identifying users for events. As discussed herein, rule data 236 may indicate that different factors may be evaluated for different events. Further, rule data 236 may indicate that different factors may be evaluated for different users for different or for the same event. For example, rule data 236 may evaluate a stress level of a teenager living in a home (e.g., as such a stress level may impact reliability), but may not evaluate a stress level of the parents living in a home, when evaluating a user for response. In some examples, rule data 236 may include a default user for each event (and/or a predetermined alternating default user, or the like).

Memory 230 may also include analysis techniques 238 that controller 110 may use to recognize and analyze factors in data as gathered from user devices 120 and/or sensors 130 over network 150. For example, analysis techniques 238 may include such data analyzing techniques as natural language processing (NLP) techniques, image recognition techniques, speech-to-text techniques, or the like. NLP techniques can include, but are not limited to, semantic similarity, syntactic analysis, and ontological matching. For example, in some embodiments, processor 220 may be configured to parse messages from user devices 120 and/or directed to user devices 120 to determine semantic features (e.g., word meanings, repeated words, keywords, etc.) and/or syntactic features (e.g., word structure, location of semantic features in headings, title, etc.). Ontological matching could be used to map semantic and/or syntactic features to a particular concept. The concept can then be used to determine the subject matter. In this way, using NLP techniques, controller 110 may, e.g., identify an email received by one or more user devices 120 as related to an event, and/or identify text messages sent between user devices 120 as relating to one or more events, or the like.

Similarly, analysis techniques 238 may include image recognition techniques such as optical character recognition (OCR) for identifying text within received images, or general shape identification and/or recognition techniques, or object tracking techniques where images are received as a stream of images (e.g., as part of a video feed). Controller 110 may use these analysis techniques 238 to analyze image data from sensors 130 or the like. Further, analysis techniques 238 may include speech-to-text techniques that may be used by controller 110 to identify the text of speech said by the user in order to communicate with user and/or to identify when users are stressed and/or to identify when users are using user devices 120 or the like the talk about events over a phone call or the like.

Figure 3:
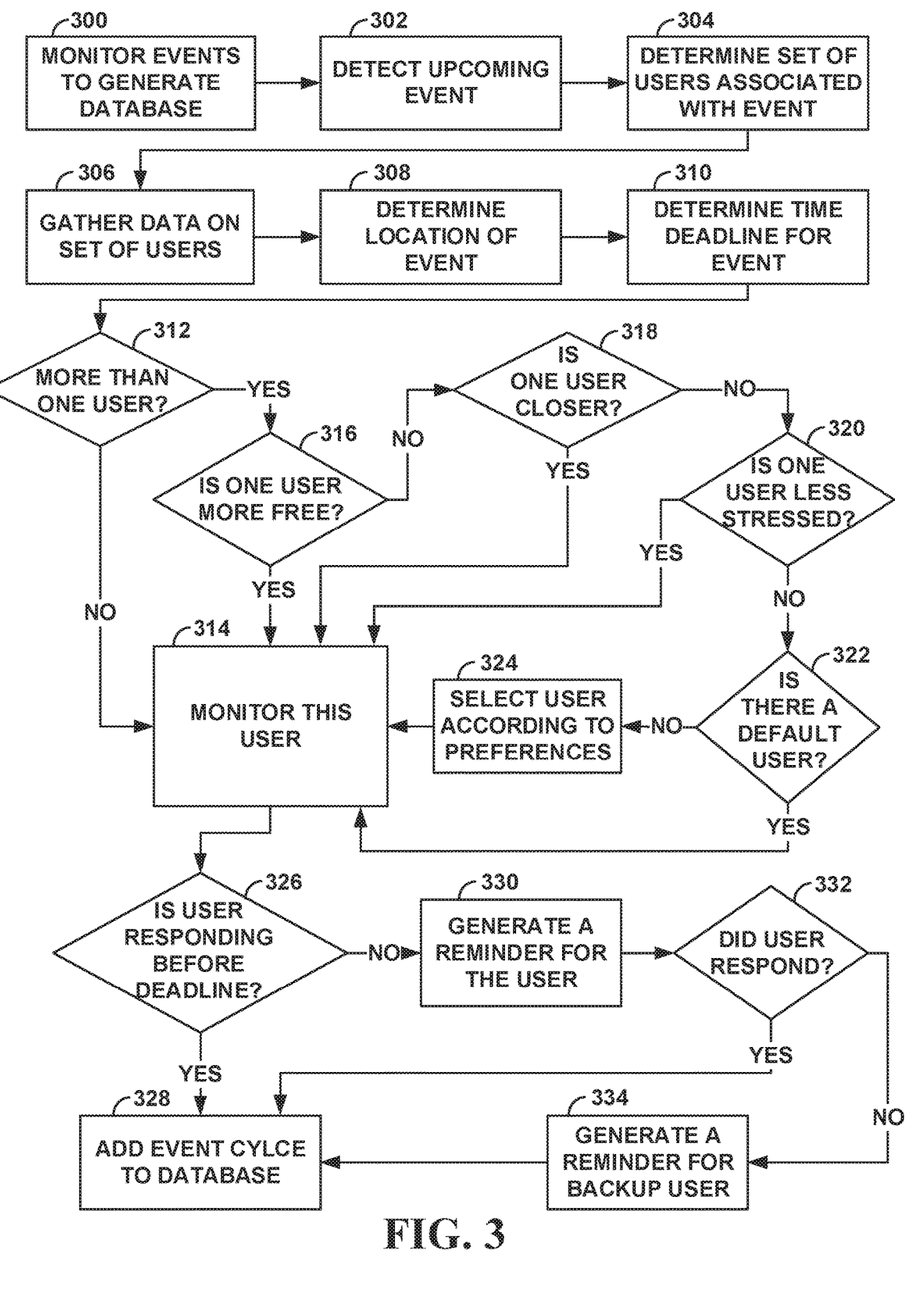
FIG. 3 depicts an example flowchart of managing event response.

Using this computing system 200, controller 110 may manage the responses of a plurality of users to a plurality of events as discussed herein. For example, controller 110 may manage event responses according to the flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples system 100 may execute a different method than the flowchart of FIG. 3, or system 100 may execute a similar method with more or less steps in a different order, or the like.

Controller 110 may monitor event data across network 150 to identify events and relevant users and event rules and the like (300). In some examples, controller 110 may generate database 140 with event data and user data and rule data as described herein. In other examples, some of database 140 may already be prepopulated (e.g., via users entering events to be monitored, and/or from a standard generic database 140 that is used as a template and therein tailored to the users, after which controller 110 generates rule data and/or user data and the like for these prepopulated events using analysis techniques as described herein). In either example, controller 110 may monitor event data and response data as detected over network 140 to add to and/or update data of database 140 over time according to machine learning techniques such as those described herein.

For example, controller 110 may monitor emails, text messages, phone calls, or the like sent between user devices 120. Controller 110 may further monitor alerts and the like generated by sensors 130. These alerts may include proximity alerts, location alerts, biometric alerts, or the like. Further, in some examples controller 110 may crawl through one or more online data repositories to monitor events. For example, where controller 110 is managing events for a family with a student in a middle school, controller 110 may be configured to monitor an online version of a calendar for the middle school to analyze middle school events for the student.

Once database 140 is generated, controller 110 may compare gathered or received data against database 140 to detect an upcoming event (302). For example, controller 110 may compare data gathered or received from one or more location on network 150 against event profiles saved on database 140. Controller 110 may then determine a set of users associated with the detected event (304). The set of users may be less than all users of the database 140. The set of users may include all users that have previously responded to the event and/or could potentially respond to the event.

Controller 110 may gather data on each user of the set of users (306). Controller 110 may gather data using one or more user devices 120, sensors 130, and/or online repositories that may include data on the one or more users. Controller 110 may gather such data as user position (e.g., using GPS of a mobile phone user device 120 of the user), a current activity of the user (e.g., by referencing a calendar of the user, and/or referencing a user device 120 and/or sensor 130 near to the user to evaluate recent actions of the user), a current stress level of the user (e.g., by referencing biometric data from a smart watch or the like of the user), a current environment of the user (e.g., including weather or traffic or construction that is near the user), or the like.

Controller 110 may further determine a location of the event (308). In some examples, an event may be at a same location every time, such that controller 110 may reference database 140 to determine where the event is located. For example, for an event "picking up student at a bus stop," the but stop may be at substantially the same location each time, such that a single location as stored in database 140 may suffice. For other examples, a location for an event may change slightly or entirely between events. For example, for an event "pick up from basketball practice," the practice may alternate between two gyms depending on the day of the week. In some examples, controller 110 may crawl through other sources (e.g., such as a public online repository of data that may indicate the location) to determine the location of the event. In either example, controller 110 may determine the location of the event.

Once controller 110 determines the location of the event, controller 110 may determine one or more time deadlines for responding to the event (310). The time deadline may be the time at which a user must respond (e.g., start moving in a manner to address the event) in order to get to the event location in time. In some examples, controller 110 may identify a time deadline for each user. For example, where three users are at different locations and have to travel using different means (e.g., by driving, taking public transportation, and biking), controller 110 may determine different time deadlines for each user.

Controller 110 may determine whether or not database 140 indicates that more than user is associated with this event (312). If only one user is associated with this event, controller 110 may determine that logically this user has to be the user to respond to the event. As such, controller 110 may monitor this user (314). Monitoring the user may include determining whether or not the user is already responding to the event.

If more than one user is associated with the event, controller 110 may determine if one user is relatively more free or available (316), and the identified user(s) are monitored (314). Controller 110 may determine that a user is freer than they would be otherwise if they are not currently engaged and/or soon-to-be engaged in an activity that the user does not typically step away from. Controller 110 may reference a calendar associated with the user to determine if a user is free. For example, if a user is currently in a business meeting, controller 110 may determine that the user is relatively busy. Controller 110 may also gather data from one or more user devices 120 and/or sensors 130 or the like to determine how busy a user is. For example, if controller 110 gathers data from sensors 130 indicating that a user is at home reading a book, controller 110 may determine that the user is relatively free. Alternatively, if controller 110 gathers data from user device 120 that indicates that a user is currently on a phone call with a supervisor, controller 110 may determine that the user is relatively busy. Controller 110 may determine over time what constitutes a user being free, as similar activities may indicate being free for one user and not for another (e.g., a teenage user may be less likely to respond when playing video games, while an adult user may be more likely to respond when playing video games). Controller 110 may identify these factors as indicating being free or available based on whether the users respond or not during these activities, thus updating database 140 accordingly.

Where controller 110 determines that one user is substantially more available than other users, controller 110 may identify this user as the user to respond to the event, such that controller 110 may monitor this user (314) as described herein. Otherwise, if controller 110 determines that there is no one user that is substantially more available than other users, controller 110 may determine whether one user is substantially closer to the event than other users (318). In some examples, where there are three or more users associated with the event, and at least two are determined to be substantially available (at 316) as described above, controller 110 may only evaluate these at least two users, or some subset of the users in order to minimize resources.

In some examples, controller 110 may execute a relatively standard determination of which user is closer by evaluating if one user is geographically closer to the event. In other examples, controller 110 may evaluate how relatively close a user is by evaluating an amount of time that a user may have to take to get to the destination. For example, if controller 110 determines that one user is two miles away with a full tank of gas and another user is one mile away and nearly out of gas, controller 110 may determine that the first user is effectively closer as a result of the second user having to get gas. For another example, if controller 110 determines that a first user has to navigate through heavy construction while a second user has relatively clear roads between herself and the event, controller 110 may determine that the second user is functionally or temporally closer to the event (e.g., even if the second user has a longer distance to travel). For yet another example, if controller 110 determines that a first user is two miles away and has to use public transit to get to the location and a second user is five miles away but has access to another car, controller 110 may determine that the second user is relatively closer as result of having a more direct route (e.g., in response to analyzing public transit and verifying that there are no immediately available direct routes from the first user to the event location).

If controller 110 determines that one of the remaining set of users is closer, controller may identify that this user is the user to respond to the event, and therein may monitor this user (314) as described above. Otherwise, if controller 110 determines that no one user is substantially closer, controller 110 may determine if one user is substantially less stressed than other users (320). As described above, where three or more users were determined to be associated with the event, and at least two are both determined to be substantially available (at 316) and determined to be relatively close to the event (at 318), controller 110 may only evaluate these at least two users.

Controller 110 may determine whether users are stressed using biometric data of the users as described above. For example, controller 110 may identify an elevated heart rate as indicating a stressed user. Additionally, or alternatively, controller 110 may determine whether users are stressed by evaluating a voice of the user (e.g., where controller 110 can hear the user), or by pupil dilation of the user (e.g., where controller 110 can gather visual data of the user), or the like. Controller 110 may alternatively identify how stressed a user is by analyzing recent messages sent by the user. For example, if the user is usually relatively emotive and enthusiastic (e.g., as evidenced by positive emoticons, exclamation points, and the like as sent within texts or the like), but text messages sent within the previous 90 minutes were relatively non-emotive or passive, controller 110 may determine that the user may be stressed.

If controller 110 determines that one user is relatively less stressed, controller 110 may determine this user as the user to respond to the event. As such, controller 110 may monitor this user (314). Where controller 110 does not determine that any one user is less stressed, controller 110 may determine if there is a default user for responding to this event. If there is a default user for this event, controller 110 may monitor this user (314).

If there is not a default user, controller 110 may select a user according to preferences as saved within database 140 (324). For example, preferences as saved within database 140 may indicate that controller 110 alternates for this specific event (e.g., alternate randomly between users, or alternate evenly between two users, or the like). Alternatively, preferences as saved within database 140 may indicate that controller 110 may alternate for any events detected. Alternatively, preferences may indicate that some users will respond during some hours, and other users may respond during other hours, or the like. In some examples, the preferences may further indicate to pick the user that is more reliable, where one user has been relatively more likely to respond to the event by the deadline absent exigent circumstances. Regardless, once controller 110 determines a responding user according to the preferences within database 140, controller 110 may monitor this user (314) as described above.

Controller 110 may determine whether or not this user is responding to the event before the deadline determined for this specific user (326). Controller 110 may determine that a user is starting to respond if the user starts physically moving toward the event location. Alternatively, or additionally, controller 110 may determine that a user is responding as a result of the user affirmatively sending a message to controller 110 and/or to another user regarding the event.

In some examples, if the user starts affirmatively responding for the event before the deadline, controller 110 may elect to not send a notification. In other examples (not depicted), controller 110 may elect to send a reminder to the user anyway (e.g., according to preferences of the user as saved in database 140). In either example, controller 110 may add this event cycle to database 140. The event cycle may include the detection of the event, the gathering of data, the evaluation of users, the response of the user, and/or if the user gets to the event on time. In some examples, controller 110 may further update some or more database rules or user profiles or event data as a result of the event cycle. For example, controller 110 may determine to increase a deadline time if the user gets to the event late.

If controller 110 determines that the user is not responding before the deadline, controller 110 may generate a reminder for the user (330). The reminder may be generated as a text message or an auditory alert or the like. Once generated, controller 110 may determine whether or not the user responds (332). Controller 110 may determine that the user responds if the user starts moving toward the event, or the user generates an affirmative message in response to the reminder, or the like. If controller 110 determines that the user responds to the reminder, controller 110 may add the event cycle to database 140 as described herein (328).

If controller 110 determines that the user is not responding, controller 110 may generate a reminder for a backup user (334). A backup user may include a user that was the second most free, close, relaxed, or the like as described above. In some examples, as controller 110 executes the user-determination operations (312-324), controller 110 may generate a ranked list of users. Controller 110 may then notify these users according to their respective rank in the event that the more available/close/relaxed/etc. user does not respond. Once an event is responded to (or the event itself is detected as expiring), controller 110 may add this event cycle to database 140 as described above (328). In examples where a user does not respond, controller 110 may update rules within database 140 accordingly. For example, controller 110 may change thresholds and/or preferences to make it relatively less like that the user that did not respond is notified in future circumstances that are similar to the circumstances that controller gathered (306) in this instance.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    detecting, by a processor, an upcoming event associated with a predicted time in the future;
    identifying, by the processor consulting a database of user actions, a set of users of the database that have responded to events of the database that correspond with the upcoming event;
    gathering, by the processor, data on a current state of each user of the set of users;
    gathering, by the processor and in response to detecting the upcoming event, environment data relating to the upcoming event;
    identifying, by the processor analyzing the data and the database, a user of the set of users to respond to the upcoming event;
    determining, by the processor and based on the environment data, a deadline time at which the user must act in order to respond to the upcoming event by the predicted time;
    determining, by the processor using the database and the data, that the deadline time is approaching; and
    generating a reminder for the user, by the processor in response to determining that it is approaching the deadline time.

2. The method of claim 1, further comprising:
    gathering, by the processor, an update on the data on the current state of the user;
    responsive to gathering the update, identifying, by the processor, that the user has not responded to the upcoming event,
    wherein the reminder for the user is generated in response to identifying that the user has not responded to the upcoming event.

3. The method of claim 1, wherein the upcoming event is associated with a location and identifying the user includes determining that the user is relatively closer to the location than other users of the set of users.

4. The method of claim 1, wherein identifying the user includes determining that the user is relatively less busy than other users of the set of users.

5. The method of claim 1, wherein identifying the user includes determining that the user is relatively less stressed than other users of the set of users.

6. The method of claim 1, wherein the upcoming event is associated with a location and identifying the user includes determining that the user is relatively more likely to be able to arrive at the location by the predicted time than other users of the set of users.

7. The method of claim 1, wherein the user is a first user and the reminder is a first reminder, the method further comprising:
    identifying, by the processor, the first user failing to act prior to the deadline time;
    identifying, by the processor analyzing the data and the database, a second user of the set of users to respond to the upcoming event; and
    generating, by the processor and in response to identifying the first user failing to act prior to the deadline time, a second reminder for the second user.

8. The method of claim 1, wherein gathering the data includes gathering data from one or more mobile devices associated with the set of users.

9. The method of claim 1, wherein gathering the data includes gathering data from devices connected to the Internet of Things (IoT) that are near users of the set of users.

10. A system comprising:
    a processor; and
    a memory in communication with the processor, the memory containing instructions that, when executed by the processor, cause the processor to:
        detect an upcoming event associated with a predicted time in the future;
        identify, by consulting a database of user actions, a set of users of the database that have responded to events of the database that correspond with the upcoming event;

gather data on a current state of each user of the set of users;

gather, in response to detecting the upcoming event, environment data relating to the upcoming event;

identify, by analyzing the data and the database, a user of the set of users to respond to the upcoming event;

determine, based on the environment data, a deadline time at which the user must act in order to respond to the upcoming event by the predicted time;

determine, using the database and the data, that it is approaching the deadline time; and generate, in response to determining that it is approaching the deadline time, a reminder for the user.

11. The system of claim 10, the memory further containing instructions that, when executed by the processor, cause the processor to identify, by gathering an update on the data on the current state of the user, that the user has not responded to the upcoming event, wherein the reminder for the user is generated in response to identifying that the user has not responded to the upcoming event.

12. The system of claim 10, wherein the upcoming event is associated with a location and identifying the user includes at least one of determining that the user is relatively closer to the location than other users of the set of users or determining that the user is relatively more likely to be able to arrive at the location by the predicted time than other users of the set of users.

13. A computer program product comprising a computer readable storage medium having program instructions embodied therewith, the program instructions executable by a computer to cause the computer to:

detect an upcoming event associated with a predicted time in the future;

identify, by consulting a database of user actions, a set of users of the database that have responded to events of the database that correspond with the upcoming event;

gather data on a current state of each user of the set of users;

gather, in response to detecting the upcoming event, environment data relating to the upcoming event;

identify, by analyzing the data and the database, a user of the set of users to respond to the upcoming event;

determine, based on the environment data, a deadline time at which the user must act in order to respond to the upcoming event by the predicted time;

determine, using the database and the data, that it is approaching the deadline time; and generate, in response to determining that it is approaching the deadline time, a reminder for the user.

14. The computer program product of claim 13, the computer readable storage medium containing further containing program instructions that, when executed by the computer, cause the computer to:

monitor responses of each user of the set of users to a plurality of events similar to the upcoming event over time;

generating the database using each of the plurality of events and the responses and the set of users; and identify, by gathering an update on the data on the current state of the user, that the user has not responded to the upcoming event, wherein the reminder for the user is generated in response to identifying that the user has not responded to the upcoming event.

15. The computer program product of claim 13, wherein the upcoming event is associated with a location and identifying the user includes at least one of determining that the user is relatively closer to the location than other users of the set of users or determining that the user is relatively more likely to be able to arrive at the location by the predicted time than other users of the set of users.

* * * * *